Patented June 28, 1932

1,865,035

UNITED STATES PATENT OFFICE

LINCOLN CHARLES NEALE, OF FLEMINGTON, AUSTRALIA

PROCESS FOR THE MANUFACTURE OF PRINTER'S INK

No Drawing. Application filed November 17, 1928, Serial No. 320,213, and in Australia September 21, 1928.

This invention relates to a process for the manufacture of printer's ink and the resulting product, and has been devised for the purpose of utilizing vulcanized rubber, especially waste vulcanized rubber, mixed with other ingredients hereinafter mentioned, making a preparation possessing the desired viscosity and having waterproof properties.

The process of the present invention is defined by several steps, each of which constitute important features of the invention, together with the resultant product of the process. The main features embodied in the invention are as follows:—

1. The process of the present invention involves the utilization of used and old rubber tyres or vulcanized rubber. When rubber tyres or rubber combined with fabric or other material in the form of tyres, is used as a base for the product, the tyres are preferably cut into substantially small pieces and immersed in a bath of sulphuric acid of a strength usually employed for such purpose, and left for a period sufficient to dissolve the fabric or other similar material of the tyre after which the mass is neutralized by immersion in a bath of approximately 10% of caustic soda. It may be desired to reduce old rubber tyres or rubber combined with fabric. If this is done the immersion in the bath of sulphuric acid to destroy the fabric or the like material is dispensed with. Whichever of the aforesaid treatments is availed of the resultant mass is then treated with a residual crude hydrocarbon oil or its equivalent, heated to a temperature sufficiently high to produce a liquid mass. Where a pulverized raw material is used, the hot liquid mass resulting from treatment with the oil is strained in any suitable manner to remove the particles of fabric dirt or other foreign matter.

2. After the rubber has been converted into a liquid mass, carbon black or other pigments such as vegetable black, bone black, lampblack, or other desired colouring ingredient, up to 25% of the mass, may be added if desired, as the mass at this stage may possess sufficient colour without the addition of further colouring.

3. A usual commercial varnish, for instance one containing resin, China wood oil and manganese dioxide, approximately up to 10% of the volume of the liquid mass, is added to the mass and finally the mass is ground to furnish a semi-liquid of a thick consistency suitable for use as printer's ink.

In carrying the invention into practical effect and to describe the process in relation thereto, vulcanized rubber and especially vulcanized rubber waste, (i. e. used and old rubber such as old vulcanized rubber tyres) is cut into pieces of any desired size according to the size of the tyre; or the rubber may be removed from the fabric of the tyre. The pieces of rubber tyre or rubber combined with fabric or other similar material are placed in a bath of sulphuric acid of a strength usually employed for such purpose, and allowed to remain for the desired period, preferably 84 hours. At the end of such time of immersion, it will be found that the fabric or like material of the tyres is destroyed and the rubber remains. The resultant mass of rubber is now removed from the bath and is neutralized by immersion in a bath of a 10% caustic soda solution. The neutralized rubber mass is then treated in any suitable manner with a residual crude hydrocarbon oil or its equivalent, and the mixture is then heated to a temperature sufficiently high to produce a liquid mass. If the rubber tyre or rubber combined with fabric or similar material is reduced, as hereinbefore described, the immersion in the bath of sulphuric acid is dispensed with and the reduced mass is directly treated with residual crude hydrocarbon oil as before stated. After heating to produce a liquid mass, the mass is strained for the purposes hereinbefore set forth, after which if colouring is required, carbon black or its equivalent such as vegetable black, bone black, lampblack, or any desired colouring ingredient up to 25% of the mass, is added. The liquid mass is then subjected to agitation, after which varnish containing resin, China wood oil and manganese dioxide up to 10% by volume of the mass is also added, and the mixture or mass is again thoroughly agitated.

The mass may be then ground in any suitable manner, preferably by passing through rollers until it assumes the property of a semi-liquid or smooth paste, and the resultant product is, as before stated, a commerical printer's ink. The resultant product prepared according to the process hereinbefore described will not only be cheap in manufacture but will also have the property of great utility for the purposes hereinbefore set forth.

I claim:

1. A process of making printer's ink, which comprises comminuting waste vulcanized rubber, digesting the comminuted rubber in a hydrocarbon oil at a temperature sufficiently high to produce a liquid mass, incorporating into the liquid mass pigmenting agents of the type of carbon black and a varnish of the "drying" class, and grinding the resulting mixture to ensure a smooth consistency.

2. A process of making printer's ink, which comprises comminuting waste vulcanized rubber, digesting the comminuted rubber in a hydrocarbon oil at a temperature sufficiently high to produce a liquid mass, adding a drying oil varnish not exceeding in volume 10% of the mass, and grinding the mass to ensure a smooth consistency.

In testimony whereof I have affixed my signature to this specification.

LINCOLN CHARLES NEALE.